Aug. 1, 1961 G. B. FLIEZAR ET AL 2,994,169
APPARATUS FOR EXHAUSTING TRAVELING WAVE TUBES
Filed Nov. 20, 1959 5 Sheets-Sheet 5
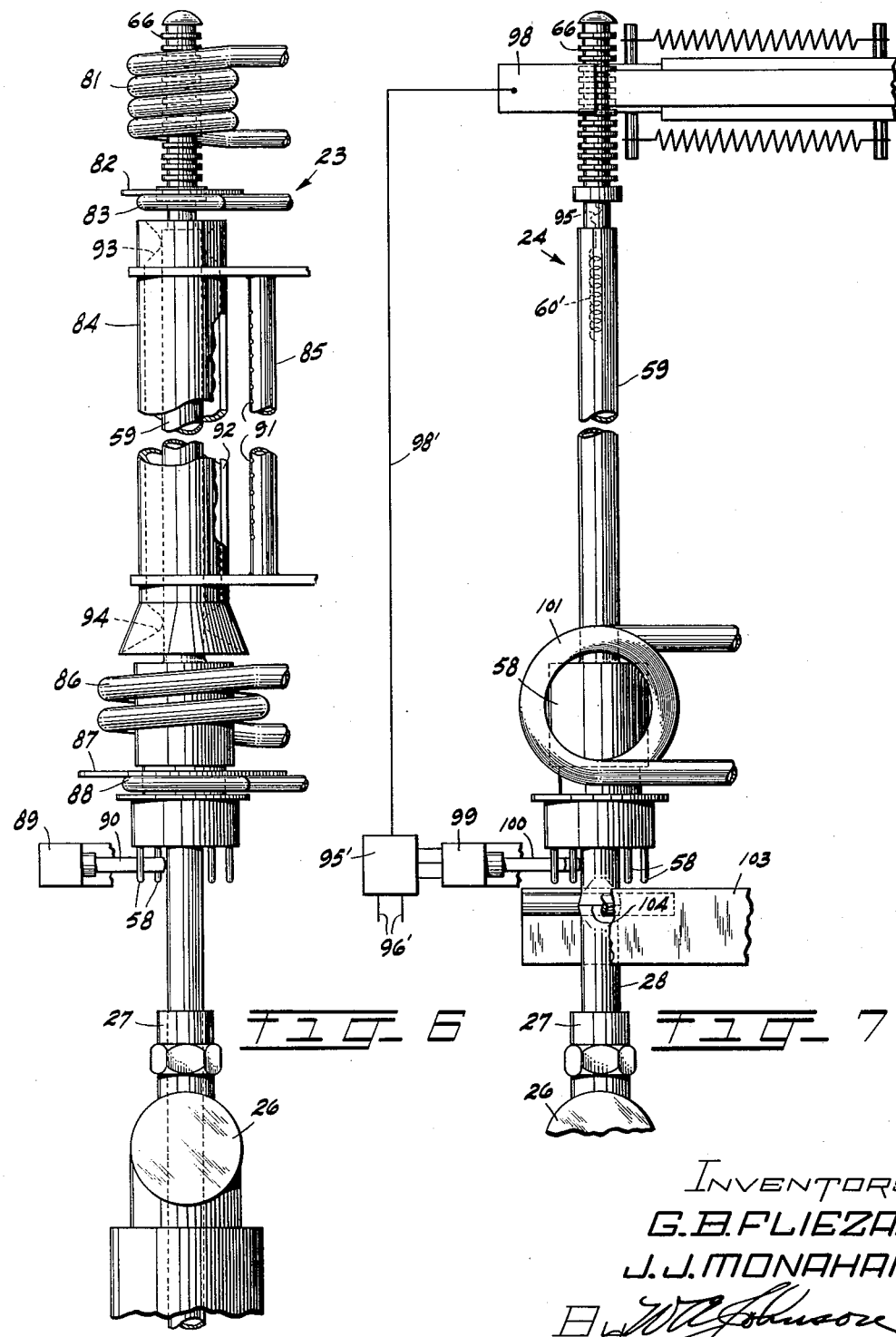
INVENTORS
G. B. FLIEZAR
J. J. MONAHAN
BY
ATTORNEY

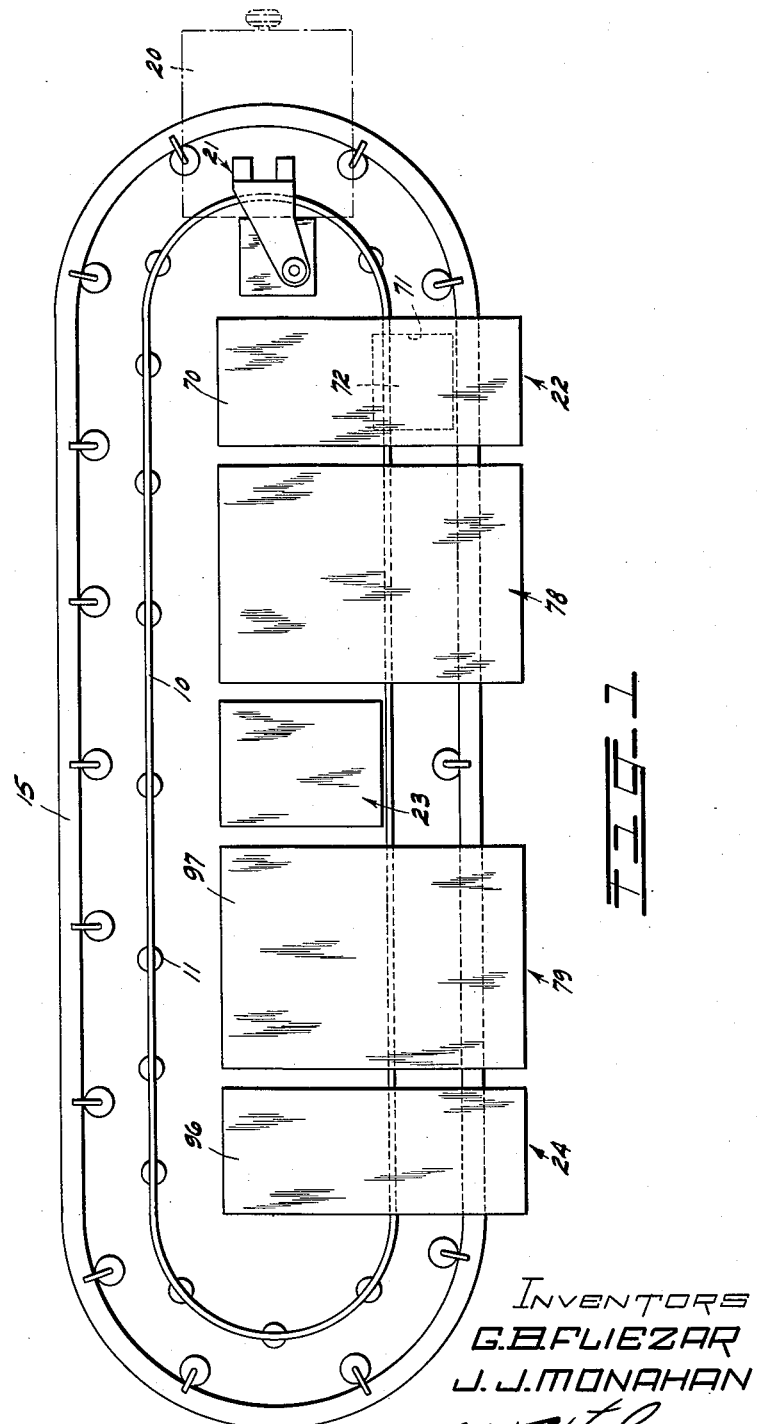

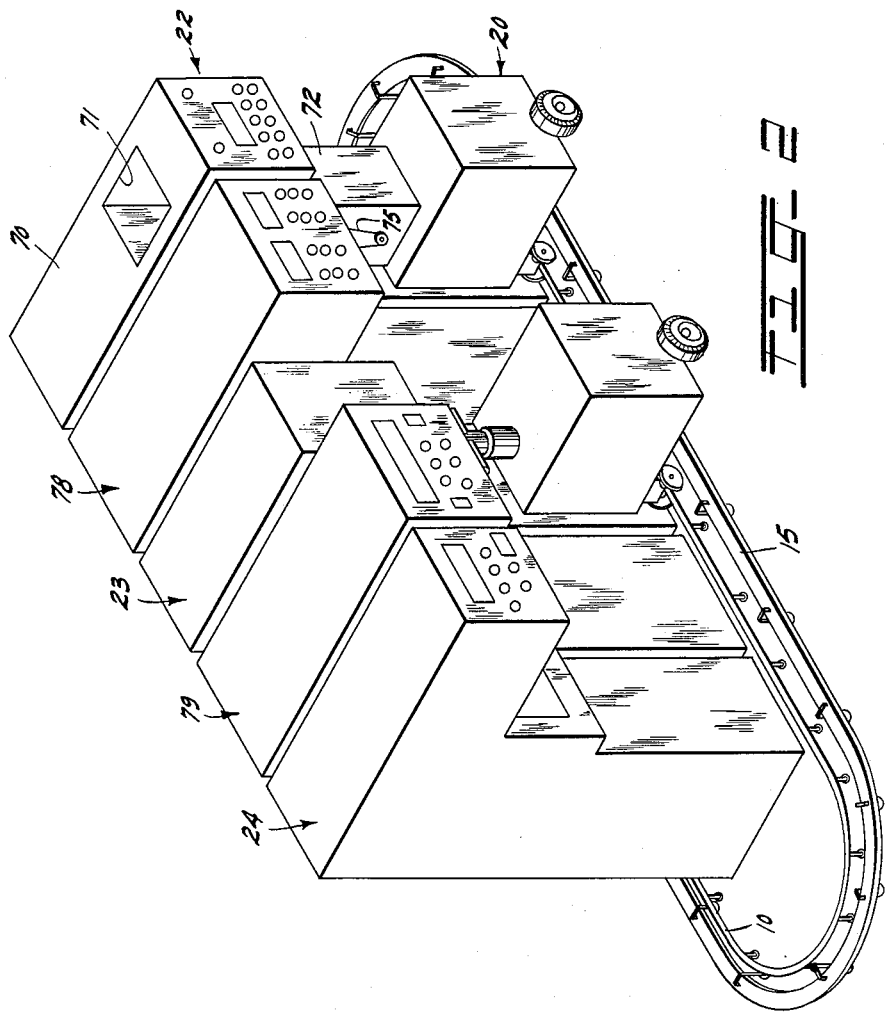

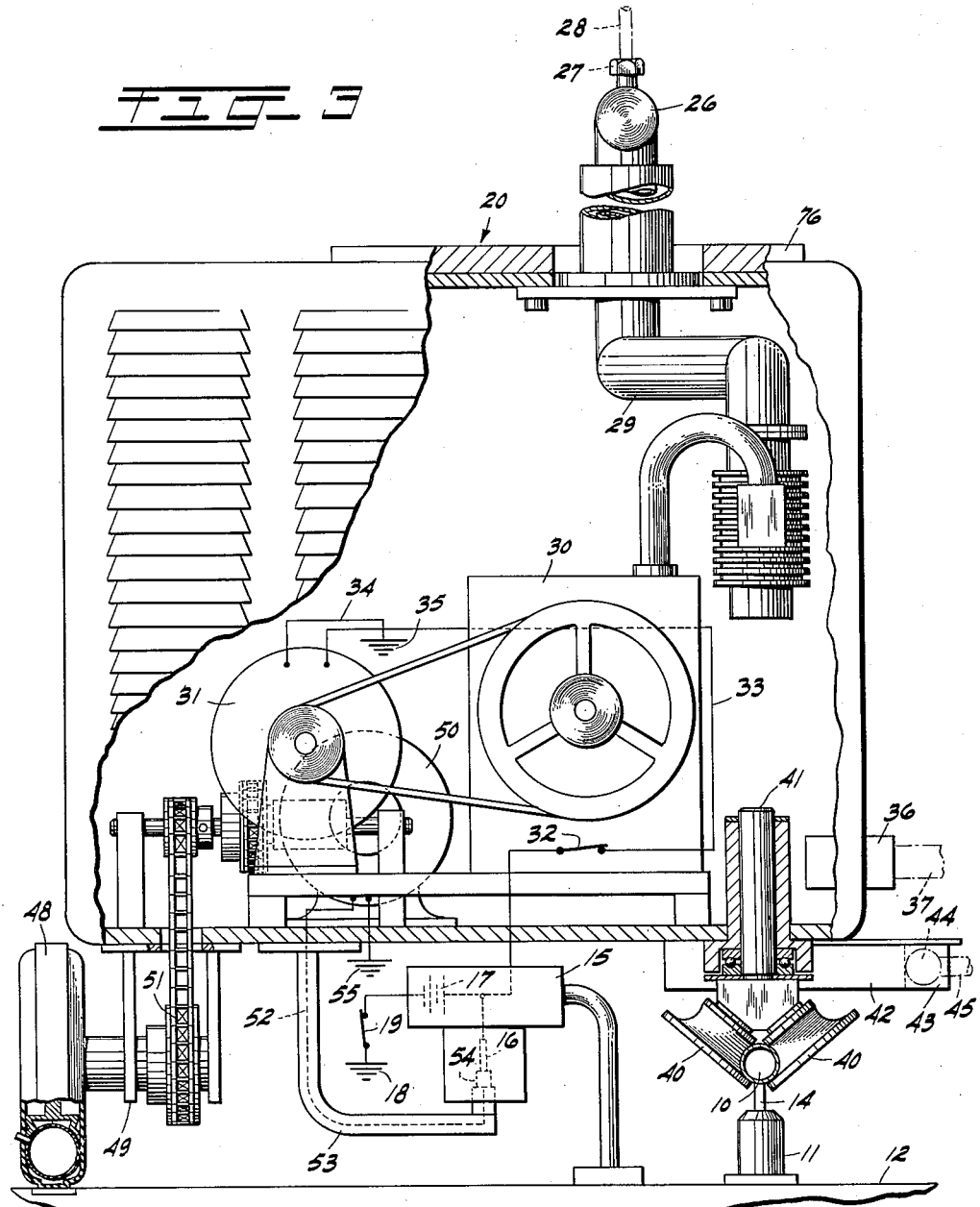

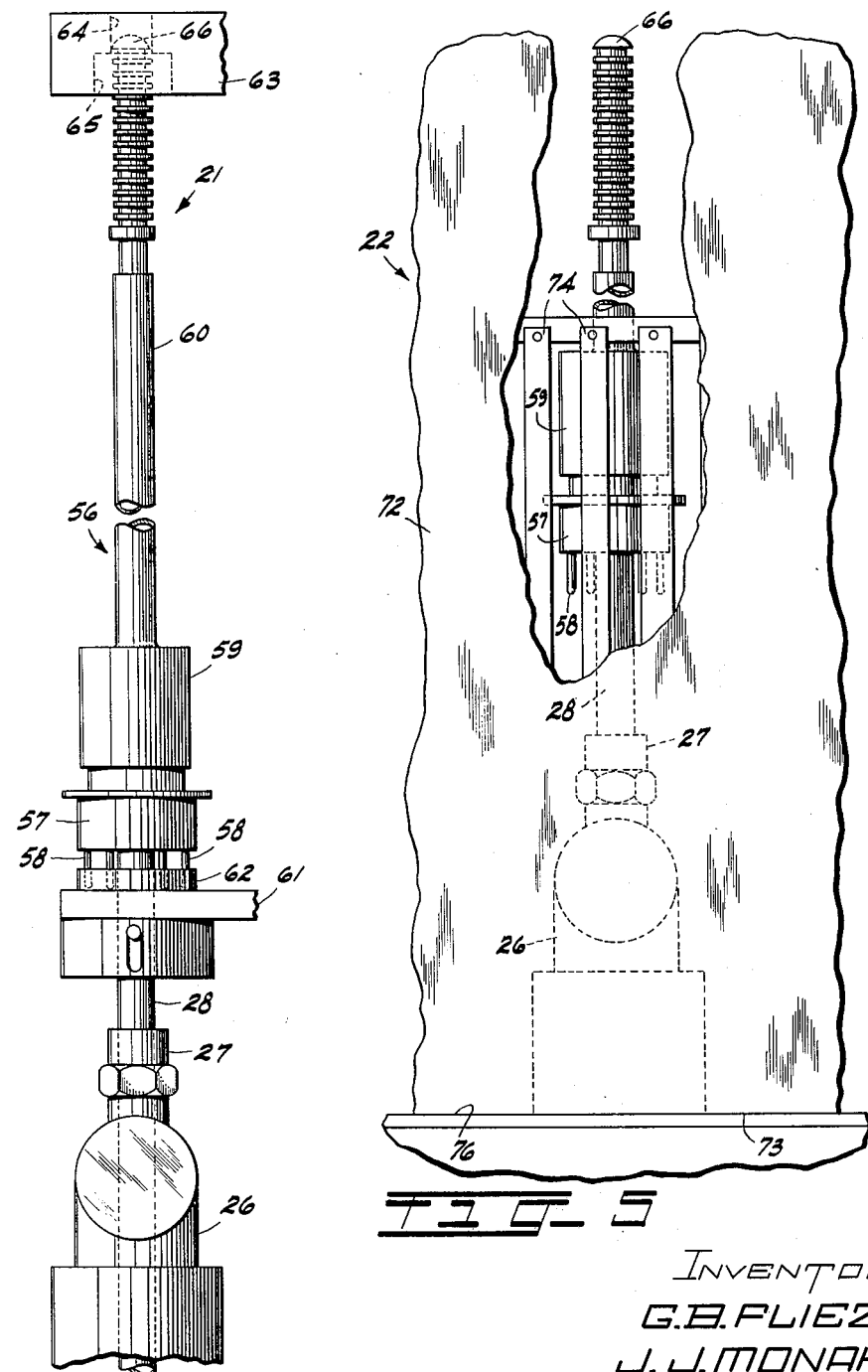

United States Patent Office 2,994,169
Patented Aug. 1, 1961

2,994,169
APPARATUS FOR EXHAUSTING TRAVELING WAVE TUBES
Geza B. Fliezar and Jack J. Monahan, Allentown, Pa., assignors to Western Electric Company, Incorporated, New York, N.Y., a corporation of New York
Filed Nov. 20, 1959, Ser. No. 854,279
12 Claims. (Cl. 53—112)

This invention relates to apparatus for treating hollow articles particularly vacuum tubes.

The vacuum tube being treated, in the present instance, is a traveling wave tube and due to its lengthy hollow structure and the positions of the various elements therein, it is very difficult to evacuate and cannot be evacuated efficiently and in the time desired by the previously known methods and apparatus. In addition to the suction means for drawing air out of the tubes, satisfactory evacuation requires additional treating means to apply heat to the elements to drive out air occluded in the elements.

The object of the invention is an efficient apparatus for exhausting articles, such as vacuum tubes.

In accordance with the object, one of the features of the invention includes an apparatus for treating articles, such as vacuum tubes, having open tubulations at their lower ends receivable in suction heads of dollies movable successively to different stations.

The apparatus comprises a continuous track with a plurality of like dollies having supporting wheels, some of which ride on the track to control the path of the dollies to successive stations disposed adjacent the track. One of the features of the apparatus includes individual motors supported by the dollies to drive the dollies to the successive stations. Holders for the articles, mounted on the dollies, are adapted to receive and grip the tubulations of the articles while gages, at one of the stations, are actuable to locate the articles in the holders while elements at other stations are actuable to treat the articles.

Other objects and advantages will be apparent from the following detail description when considered in conjunction with the accompanying drawings wherein:

FIG. 1 is a top plan view of the apparatus;
FIG. 2 is an isometric view of the apparatus;
FIG. 3 is a detailed vertical sectional view of one of the dollies illustrating its track, the driving means, and the exhaust unit;
FIG. 4 is a fragmentary side elevational view of the loading station where an article is mounted in the suction head of one of the dollies;
FIG. 5 is a fragmentary side elevational view of a portion of an oven lowered over the article at a bake-out station;
FIG. 6 is a fragmentary side elevational view of the article at another station; and
FIG. 7 is a fragmentary side elevational view of the article at the finishing station.

The apparatus, as shown in FIGS. 1 and 2, includes a continuous track 10 supported by spaced elements 11 which are mounted on the floor 12, as illustrated in FIG. 3, with intermediate portions 14 providing vertical adjustment for the track 10 to assure its position in a given plane. A continuous housing 15 for a conductor bar or feed rail 16, FIG. 3, extends about the track 10 and, as illustrated in FIG. 3, the conductor bar 16 is supplied with electrical energy represented by a battery 17 which is grounded at 18 in a circuit including a switch 19.

The dollies 20 are identical with any desired number of dollies employed to assure maximum efficiency of the apparatus so that while one dolly is located at a loading station 21, others will be located at other stations 22, 23, and 24. The dollies are the subject matter of applicants' co-pending application, Serial No. 853,968, filed November 18, 1959. Each dolly has a suction head 26 having sockets or chucks 27 to removably receive tubulations 28 of the articles to be treated. In the present instance, there are two articles mounted on each suction head. Furthermore, each dolly 20 has a connection 29 between an exhaust unit 30 and the suction head 26, the exhaust unit being driven by a motor 31 mounted in the dolly. If desired, the exhaust unit 30 may be operated continuously after leaving loading station 21 until it is ready to leave the finishing station 24. This is made possible through the illustration of a circuit from battery 17 through closed switch 32 through line 33 to motor 31 and from motor 31 through line 34 to ground 35.

Each dolly is provided with a contact member 36 adapted to receive like contact elements 37 at stations 22, 23, and 24 to condition certain electrical circuits for controlling treating means at those stations. The exhaust unit 30 is operated from the feed rail 16 after leaving the loading station 21. The circuit is traced from grounded battery 17 through closed switch 32 and line 33 to the motor 31. The circuit is completed from motor 31 through line 34 to ground 35. Each dolly has two pairs of grooved rollers 40 mounted, as shown on spindles 41, to partially surround the track 10, which is circular in cross section, to control the path of movement of each dolly on the track. A member 42, with a recess 43 therein, is mounted on each dolly and adapted to receive a ball-shaped end 44 of an operable locating plunger 45 disposed at each station to locate each dolly relative to the loading and treating means. The additional supporting means for each dolly includes a pneumatic tired wheel 48, supported at 49, and connected to a motor 50 through drive means 51. The motor 50 is shown, in the present instance, having a conductor 52 extending from the motor through a tubular arm 53 to a brush 54, insulated from and supported by the arm, so as to move longitudinally in the housing 15 while electrically engaging the bar 16. This circuit is completed through ground 55.

At the loading station 21, two articles are mounted in the chucks 27 of the exhaust head 26 of the dolly at that position. In the present instance the articles, indicated generally at 56, are vacuum tubes or more specifically traveling wave tubes having a base in each tube, indicated at 57, with terminals 58 mounted at known spaced positions therein. Above the base 57 is a portion 59 which houses parts of the tube including getters which are to be out-gassed and flashed at given intervals to assist in exhausting the article or tube. A long glass tube 60 houses the helix 60' (FIG. 7) which is caused to function during the exhausting operation.

The structure of FIG. 4 is the subject matter of applicants' co-pending application, Serial No. 853,964, filed November 18, 1959. An arm 61 supports a recessed member 62 to receive the terminals 58 in predetermined oriented positions and supports the tube at a given height from the exhaust head 26 to allow the tubulation 28 to extend downwardly a given distance into the chuck 27. A gage element 63 apertured at 64 and 65 to receive an upper end 66 of the tube assists the element 61 in locating the tube vertically in the chuck 27. Suitable means, as disclosed in the co-pending application, permits movement of the elements 61, 62, and 63 free of the article once it is located and mounted in the exhaust head.

The structure shown in FIG. 5 is a part of the structure of station 22, FIG. 1, and is the subject matter of applicants' co-pending application, Serial No. 853,967, filed November 18, 1959. At station 22, a housing 70 has a vertical opening 71 for an oven 72 which is rectangular in general contour and is closed throughout with exception of the bottom end 73 which is opened to allow the oven to be lowered over the articles carried by the dolly 20 at what may be defined as a bake-out station. The housing 70 includes not only the electrical controls for the oven 72 for energizing heating elements 74, but has mounted therein driving means for the oven, a portion of which is indicated at 75, FIG. 2, to move the oven between its normal up position and its operated down position, as shown in FIGS. 2 and 5. A plate 76 mounted on each dolly 20 serves not only as a support for the oven 72, but as a means to close the open bottom end of the oven while the oven is operated to heat the articles or vacuum tubes externally while the exhaust unit 30 of each dolly, at that station, is operating to exhaust air from the articles.

Units 78 and 79 of FIGS. 1 and 2 are utilized to house certain of the controls for their respective treating units of stations 23 and 24.

At station 23, a structure, as illustrated in FIG. 6 and as more fully disclosed in applicants' co-pending application Serial No. 853,966, filed November 18, 1959, includes a plurality of treating units for each article or vacuum tube. Although, in actual practice, there are two vacuum tubes mounted in the chucks 27 of the exhaust head 26 of each dolly, only one set of units for one article or vacuum tube is shown in FIG. 6.

The units include an upper high frequency coil 81, an upper shield 82, an upper nozzle 83, an intermediate tubular shield 84, an intermediate nozzle 85, a lower high frequency coil 86, a lower shield 87, and a lower nozzle 88, all of which are mounted on a single support positioned normally above the path of the vacuum tubes, when each dolly is moved into station 23, and movable downwardly over their respective vacuum tube to the positions shown in FIG. 6 where, when operated, they will perform their respective treating functions. Also at this station, an arm or carriage 89 is moved to cause a plurality of contacts 90 supported thereby to engage predetermined terminals 58 of the vacuum tube. This also constitutes a treating unit that the contacts 90 are included in certain electrical circuits to energize the helix in the vacuum tube or traveling wave tube being treated. This is one means of assisting in driving out pockets of air in the tube to assist the exhaust pump 30 in exhausting air from the tube. The high frequency coils 81 and 86 are energized to inductively heat internal portions of the tube to further assist in exhausting the tube. To prevent damage to the tube from the electrical heating means 81, 86, and 90, a coolant is applied to other portions through the nozzles 83 and 88. However, the portions inductively heated by the high frequency coils, are protected by the shields 82 and 87 from the coolant forced from the nozzles 83 and 88.

The tubular shield 84 extends around the glass tube 60 of the portion housing the helix of the traveling wave tube which is energized through the contacts 90 and during this treating portion, that is during the energization of the helix, the glass tube is protected by forming a cylindrical casing of coolant forced from the nozzle 85 through its outlets 91 and directed through an elongated aperture 92 in the shield 84, which is substantially closed at its ends 93 and 94. After these treating operations have been completed, the treating units are moved free of the vacuum tube and during the continued operation of the exhaust pump 30, the exhausting operation continues while the dolly moves to the next station 24.

At station 24, a housing 96 adjacent a housing 97 for the mechanism of station 23, houses a structure illustrated in FIG. 7 and shown more in detail in applicants' co-pending application, Serial No. 853,965, filed November 18, 1959. Station 24 may be defined as the finishing station where normally closed spring actuated grippers 98 are given two movements during each interval of a dolly with its articles or tubes in the finishing station. One movement of each pair of grippers 98 positions them in engagement with each tube, there being two pairs of grippers for the two tubes, to hold the grippers in the finishing station gripping the upper ends of the tubes until the tubulation 28 is sealed and pinched off. The second movement removes the finished tube from the area of the dolly.

While at this station (24), another carriage 99 similar to the carriage 89 supports contacts 100 for engagement with terminals 58 of the tube to energize the helix, not shown, and to blow out the helix fuse 95 (FIG. 7). This is caused by a suitable circuit such as that illustrated schematically in FIG. 7 where a circuit controlling unit 95' receiving electrical energy from lines 96' directs a controlled electrical energy through certain of the contacts 100, their terminals 58, the helix 60', fuse 95, upper end portion 66, clamp 98 and line 98' to unit 95. At this station, pairs of high frequency coils 101 are moved outwardly and located at opposing sides of portions 59 of each tube to inductively heat internal parts of the portion 59. All of these treating means are operated to repeatedly assist the exhaust pump 30, in each instance, to continuously or repeatedly exhaust air from the tubes and when exhaustion has been accomplished, pinching jaws 103 are operated to pinch the metallic tubulation 28 closed, seal it at 104, and pinch it off, freeing the completed tube for movement by the grippers 98 away from the dolly after the grippers are opened and the units 99 and 101 are moved free of the tube.

Operation

The apparatus centers somewhat about the continuous track 10 which may be of any desired size and configuration to accommodate any desired number of dollies and any desired number of treating stations. The dollies are complete in various ways in that they contain their own driving means, they contain their own exhausting means, and they are individually adjusted and controlled in their movements on the track to assure accurate positioning of all articles or vacuum tubes being treated with respect to the treating means at the treating stations so that the treating actions may be most efficient in bringing about an efficient exhausting and sealing off of an article or vacuum tube which is most difficult to exhaust efficiently.

During the continuous operation of the exhaust units, after the vacuum tubes have been mounted at station 21, the exhausting means is repeatedly assisted first at station 22 through the application of external heat brought about by the closing or lowering of the oven over the tubes at the bake-out station. This operation applies an overall heat to the entire vacuum tube and begins the driving out of internal pockets of air. At the next or intermediate station 23, a number of operations are performed to further assist in the exhausting of each tube. There the high frequency coils 81 and 86 are energized, while adjacent portions are protected by coolant from nozzles 83 and 88. At the same time, the heated portions are shielded from the coolant by elements 82 and 87. Simultaneously therewith, or at different intervals, the helix, not shown, of the tube is energized through the contacts 90 and terminals 58 while the glass tube 60 is protected by a cylinder of coolant formed there around in the shield 84 when filled by the nozzle 85. The exhausting means continues through the continued operation of the unit 30 from station 23 to station 24 where again high frequency coils 101 are energized, the helix again energized through contacts 100 with terminals 58, and the fuse blown.

Certain elements of each vacuum tube are embodied therein and responsive to the heat applying means including getters which are out-gassed at station 23, together with the usual anode and collector of each tube. A similar action takes place at station 24 through the operation of the treating units at that station. As a result of the various treating means at stations 22, 23, and 24, made possible by the accurate mounting of the tubes in the chucks 27 of their exhaust heads 26 of each dolly, an exhausting means begins with the operation of each exhaust unit 30 of each dolly, continues through the external assists of the various heating means at stations 22, 23, and 24. Finally each tube is completely exhausted at station 24 where the metal tubulation 28 of each tube or article is pinched by the jaws 103 to close and seal the tubulation and to pinch off an excess length which remains in the chuck 27 until it is removed in the loading station or at any desired intermediate portion of its travel from the finishing unit 24 to the loading station.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for treating elongate hollow articles having open tubulations at their lower ends comprising a continuous track, a plurality of like dollies having supporting wheels some of which ride on the track and control the path of the dollies to successive stations disposed adjacent the track, individual motors supported by the dollies to drive the dollies to the successive stations, holders for the articles mounted on the dollies and adapted to receive and grip the tubulations, gages at one of the stations actuable to locate the articles in the holders, and elements at other stations to treat the article.

2. An apparatus for treating articles according to claim 1 in which an oven at a bake-out station having an open bottom is lowered over the articles at said station until the open bottom rests on the dolly and is closed thereby to externally heat the articles.

3. An apparatus for treating articles according to claim 2 in which an exhaust unit, mounted in each dolly and operatively connected to its holder, is operated during external heating of each article by the oven to exhaust the articles.

4. An apparatus for treating articles according to claim 1 in which elements at one of the stations are energized electrically to heat portions of the articles.

5. An apparatus for treating articles according to claim 4 in which an exhaust unit mounted in each dolly and operatively connected to its holder is operated during heating of portions of the articles to exhaust the articles.

6. An apparatus for treating articles according to claim 5 in which nozzles are moved into position relative to other portions of the articles to direct a coolant to said other portions.

7. An apparatus for treating articles according to claim 6 in which shields are moved to positions between the heat-treated and cool-treated portions.

8. An apparatus for treating articles according to claim 1 in which elements apply treatments to portions of the articles when positioned with their dollies at certain of the treating stations, an exhaust unit in each dolly operatively connected to each article through its holder and operated at the different treating stations to create an exhausting action during the treating actions, and a sealing unit at a final station actuated after final exhausting of each article to close the tubulation and seal it.

9. An apparatus for treating vacuum tubes having open tubulations at their lower ends comprising a continuous track, a plurality of like dollies having supporting wheels some of which ride on the track and control the path of the dollies, motor drive means in the dollies to drive them to successive stations disposed at fixed positions adjacent the track, holders for the vacuum tubes mounted on the dollies and adapted to receive and grip the tubulations of the vacuum tubes, exhaust pumps mounted in the dollies and operable to exhaust air from the tubes, gages at one of the stations actuable to locate the vacuum tubes at like given positions relative to their holders with their tubulations in the holders and elements at other stations to treat portions of the vacuum tubes.

10. An apparatus for treating vacuum tubes according to claim 9 in which an oven at one of the stations having an open bottom, and a drive for the oven operable to lower the oven over any vacuum at that station until the open bottom rests on the dolly and is closed thereby to heat the vacuum tubes to assist in exhausting the tubes.

11. An apparatus for treating vacuum tubes according to claim 9 in which high frequency coils are energized, during operation of the exhaust pumps, adjacent predetermined portions of the vacuum tubes to heat internal portions of the tubes to assist in exhausting the tubes.

12. An apparatus for treating vacuum tubes according to claim 9 in which electrical means are energized individually to heat different internal portions of the tubes, nozzles positionable adjacent certain outer portions to direct a coolant from the nozzles to said outer portions, and shields interposed between the nozzles and areas of the heated portions to protect them from the coolant.

References Cited in the file of this patent

UNITED STATES PATENTS

| | | |
|---|---|---|
| 2,237,186 | Malloy | Apr. 1, 1941 |
| 2,710,713 | Slater | June 14, 1955 |
| 2,740,570 | Breadner et al. | Apr. 3, 1956 |
| 2,857,723 | Diehl et al. | Oct. 28, 1958 |
| 2,870,586 | Pearson et al. | Jan. 27, 1959 |
| 2,874,522 | McCabe | Feb. 24, 1959 |